United States Patent
Li et al.

(10) Patent No.: US 11,351,665 B2
(45) Date of Patent: Jun. 7, 2022

(54) DEVICE FOR MEASURING EQUIVALENT SHEAR STRESS BETWEEN SHIELD SCREW CONVEYOR AND MODIFIED MUCK

(71) Applicant: WUYI University, Guangdong (CN)

(72) Inventors: Xingchun Li, Guangdong (CN);
Xinggao Li, Guangdong (CN)

(73) Assignee: WUYI University, Guangdong (CN)

( * ) Notice: Subject to any disclaimer, the term of this patent is extended or adjusted under 35 U.S.C. 154(b) by 402 days.

(21) Appl. No.: 16/748,474

(22) Filed: Jan. 21, 2020

(65) Prior Publication Data
US 2020/0262039 A1      Aug. 20, 2020

(30) Foreign Application Priority Data
Feb. 14, 2019   (CN) .......................... 201910113464.6

(51) Int. Cl.
*G01N 3/24*         (2006.01)
*B25B 23/145*       (2006.01)
*G01L 3/14*         (2006.01)

(52) U.S. Cl.
CPC ........ *B25B 23/1456* (2013.01); *G01L 3/1464* (2013.01); *G01N 3/24* (2013.01); *G01N 2203/0025* (2013.01)

(58) Field of Classification Search
CPC ..... B25B 23/1456; G01L 3/1464; G01N 3/24; G01N 2203/0025
See application file for complete search history.

(56) References Cited

U.S. PATENT DOCUMENTS

| 5,433,119 A | * | 7/1995 | Rogers | .................. | G01L 3/1485 73/862.193 |
| 9,964,435 B2 | * | 5/2018 | Arihara | .................. | G01H 1/006 |

FOREIGN PATENT DOCUMENTS

WO         WO-9705334 A1 *  2/1997  ............. E02D 15/04

* cited by examiner

*Primary Examiner* — Jamel E Williams
(74) *Attorney, Agent, or Firm* — Farjami & Farjami LLP

(57) ABSTRACT

A device for measuring equivalent shear stress between a shield screw conveyor and modified muck includes a spiral shell, a spiral device, a data calculation module and measurement components, the measurement components include a torque measurement component configured to measure spiral driving torque between the spiral device and the modified muck, an angle measurement component configured to measure a conveying angle of the modified muck, a parameter measurement component configured to measure structural parameters of the spiral device, and a density measurement component configured to measure an average density of the modified muck. The torque measurement component, the angle measurement component, the parameter measurement component and the density measurement component are respectively connected to the data calculation module, and the spiral device is installed in the spiral shell.

5 Claims, 3 Drawing Sheets

DEVICE FOR MEASURING EQUIVALENT SHEAR STRESS BETWEEN SHIELD SCREW CONVEYOR AND MODIFIED MUCK

FIELD

The present disclosure relates to a device for measuring equivalent shear stress between a shield screw conveyor and modified muck.

BACKGROUND

Shear stress of muck is an important control parameter during shield construction of underground tunnels. During normal operation of a shield screw conveyor, the shear action between an internal spiral structure and muck is different from that between a direct shear apparatus or a cross plate shear apparatus and muck, which is difficult to measure in engineering practices and is often estimated by using an empirical method. However, with the expansion of muck's performance, accuracy of this empirical calculation method can no longer meet the actual construction requirements. In order to better meet the engineering requirements, there is an urgent need for a device capable of accurately measuring equivalent shear stress between a shield screw conveyor and modified muck.

SUMMARY

In order to resolve the foregoing problems, the present disclosure is intended to provide a device for measuring equivalent shear stress between a shield screw conveyor and modified muck, which can accurately measure the equivalent shear stress between the shield screw conveyor and the modified muck, thereby meeting the requirements for shield construction.

In order to avoid the defects of the existing technology, there is provided, according to an embodiment of the present disclosure, a device for measuring equivalent shear stress between a shield screw conveyor and modified muck, including a spiral shell, a spiral device configured to load and spirally move the modified muck, a data calculation module configured to calculate equivalent shear stress and measurement components configured to measure parameters required for the data calculation module to calculate the equivalent shear stress. The measurement components include a torque measurement component configured to measure spiral driving torque between the spiral device and the modified muck, an angle measurement component configured to measure a conveying angle of the modified muck, a parameter measurement component configured to measure structural parameters of the spiral device, and a density measurement component configured to measure an average density of the modified muck. The torque measurement component, the angle measurement component, the parameter measurement component and the density measurement component are respectively connected to the data calculation module, and the spiral device is installed in the spiral shell.

In some embodiments, the spiral device includes a spiral shaft, a spiral blade wound around a periphery of the spiral shaft, and a spiral groove formed between the spiral blade and the spiral shell.

In some embodiments, the parameter measurement component includes a first measurement component configured to measure a diameter of the spiral blade, a second measurement component configured to measure a depth of the spiral groove, a third measurement component configured to measure a length of the spiral shaft, and a fourth measurement component configured to measure an installation inclination angle of the spiral device; and the first measurement component, the second measurement component, the third measurement component and the fourth measurement component are respectively connected to the data calculation module.

In some embodiments, the measurement component further includes a speed reduction motor configured to drive the spiral device to rotate, and the speed reduction motor is connected to the spiral device.

In some embodiments, the torque measurement component is a torque sensor.

In some embodiments, the present disclosure includes a spiral shell, and the spiral device is installed in the spiral shell.

One or more technical solutions provided in the embodiments of the present disclosure have at least the beneficial effects as follows. In the device for measuring equivalent shear stress between a shield screw conveyor and modified muck, the spiral device can load muck and spirally move the muck, so that the muck is subjected to the action of the screw rotation direction force between a spiral device and a spiral shell to generate a spiral driving torque, thereby enabling the shield screw conveyor to quantitatively discharge the muck during tunneling, and this is used as a precondition for measuring the equivalent shear stress. The torque measurement component can measure the spiral driving torque generated by muck under the action of the screw rotation direction force, thereby providing necessary torque parameters for measuring the equivalent shear stress. The angle measurement component can measure the conveying angle of muck on the spiral device, thereby providing necessary relevant contact parameters for measuring the equivalent shear stress. The parameter measurement component can measure structural parameters of the spiral device, thereby providing necessary equipment foundation parameters for measuring the equivalent shear stress. The density measurement component can measure an average density of the muck, thereby enabling users to understand modification characteristics of the muck and providing necessary material basis parameters for measuring the equivalent shear stress. The data calculation module can integrate the measured parameters of the torque measurement component, the angle measurement component, the parameter measurement component and the density measurement component, thereby accurately calculating the equivalent shear stress between the shield screw conveyor and the modified muck. Therefore, the present disclosure has a reasonable structure and a precise design, and can accurately measure the equivalent shear stress between the shield screw conveyor and the modified muck, thereby meeting the requirements for shield construction.

BRIEF DESCRIPTION OF THE DRAWINGS

Preferred embodiments of the present disclosure are provided below with reference to the accompanying drawings to illustrate embodiments of the present disclosure in detail.

DETAILED DESCRIPTION OF THE EMBODIMENTS

Figure 3:
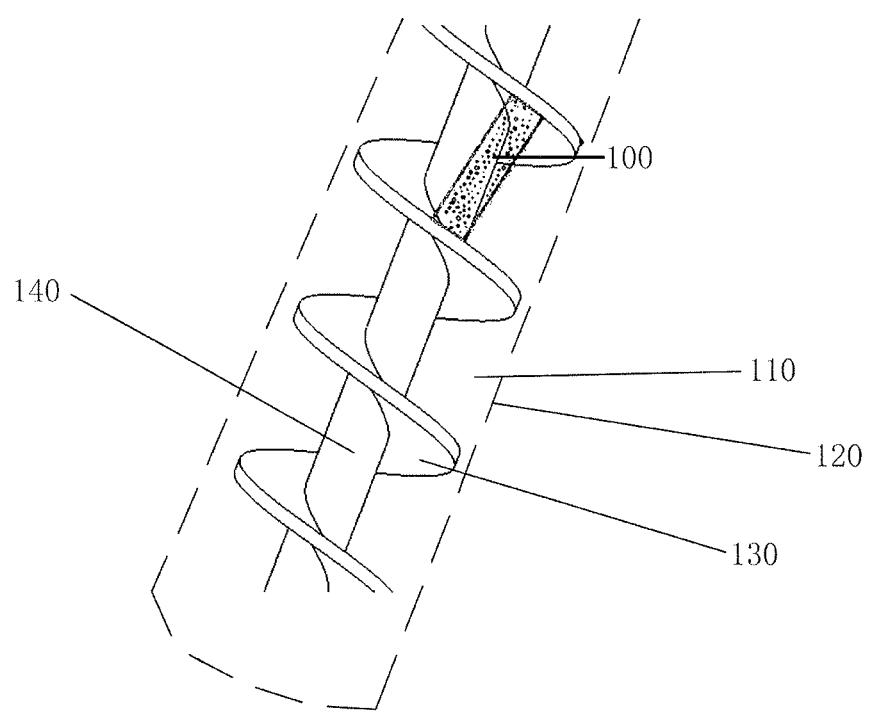
FIG. 3 is a schematic structural diagram of a muck micro unit according to an embodiment of the present disclosure.

Referring to FIG. 3, according to an embodiment of the present disclosure, there is provided a device for measuring equivalent shear stress between a shield screw conveyor and modified muck, including a spiral shell 120, a spiral device configured to load and spirally move the modified muck, a data calculation module configured to calculate equivalent shear stress and measurement components configured to measure parameters required for the data calculation module to calculate the equivalent shear stress. The measurement components include a torque measurement component configured to measure spiral driving torque between the spiral device and the modified muck, an angle measurement component configured to measure a conveying angle of the modified muck, a parameter measurement component configured to measure structural parameters of the spiral device, and a density measurement component configured to measure an average density of the modified muck. The torque measurement component, the angle measurement component, the parameter measurement component and the density measurement component are respectively connected to the data calculation module, and the spiral device is installed in the spiral shell 120.

In this embodiment, in the device for measuring equivalent shear stress between a shield screw conveyor and modified muck, the spiral device can load muck and spirally move the muck, so that the muck is subjected to the action of the screw rotation direction force between a spiral device and a spiral shell 120 to generate a spiral driving torque, thereby enabling the shield screw conveyor to quantitatively discharge the muck during tunneling, and this is used as a precondition for measuring the equivalent shear stress. The spiral device is installed in the spiral shell 120, that is, the spiral shell 120 covers the spiral device, so the spiral shell 120 can protect the spiral device and prevent external pollution or other interference from affecting the measurement accuracy. The torque measurement component can measure the spiral driving torque generated by muck under the action of the screw rotation direction force, thereby providing necessary torque parameters for measuring the equivalent shear stress. The angle measurement component can measure the conveying angle of muck on the spiral device, thereby providing necessary relevant contact parameters for measuring the equivalent shear stress. The parameter measurement component can measure structural parameters of the spiral device, thereby providing necessary equipment foundation parameters for measuring the equivalent shear stress. The density measurement component can measure an average density of the muck, thereby enabling users to understand modification characteristics of the muck and providing necessary material basis parameters for measuring the equivalent shear stress. The data calculation module can integrate the measured parameters of the torque measurement component, the angle measurement component, the parameter measurement component and the density measurement component, thereby accurately calculating the equivalent shear stress between the shield screw conveyor and the modified muck. Therefore, the present disclosure has a reasonable structure and a precise design, and can accurately measure the equivalent shear stress between the shield screw conveyor and the modified muck, thereby meeting the requirements for shield construction.

Further, according to another embodiment of the present disclosure, there is provided a device for measuring equivalent shear stress between a shield screw conveyor and modified muck, where the spiral device includes a spiral shaft 140 and a spiral blade 130, where the spiral blade 130 is wound around a periphery of the spiral shaft 140, and a spiral groove 110 is formed between the spiral blade 130 and the spiral shell 120.

In this embodiment, when rotating, the spiral blade 130 rotates around the spiral shaft 140. Because the spiral groove 110 is disposed between the spiral blade 130 and the spiral shell 120, the spiral groove 110 is also forced to rotate. Since the spiral groove 110 is loaded with modified muck, the modified muck is also driven, thereby generating friction shear stress with the spiral shell 120. Therefore, a precondition is created for measuring the equivalent shear stress between the shield screw conveyor and the modified muck, and the modified muck can be discharged by the shield screw conveyor.

According to a further embodiment of the present disclosure, there is provided a device for measuring equivalent shear stress between a shield screw conveyor and modified muck, where the parameter measurement component includes a first measurement component configured to measure a diameter of the spiral blade 130, a second measurement component configured to measure a depth of the spiral groove 110, a third measurement component configured to measure a length of the spiral shaft 140, and a fourth measurement component configured to measure an installation inclination angle of the spiral device. The first measurement component, the second measurement component, the third measurement component and the fourth measurement component are respectively connected to the data calculation module.

In this embodiment, the diameter of the spiral blade 130 affects the force by which the muck is driven to move spirally, the depth of the spiral groove 110 affects the friction shear stress between the muck and the spiral shell 120, and the length of the spiral shaft 140 affects the time for which the muck moves spirally (namely the time for which friction shear between the muck and the spiral device acts). The installation inclination angle of the spiral device affects an angle of the friction shear stress of the muck in the normal direction of the spiral shaft 140, and by measuring the foregoing four parameters, necessary parameters for measuring the equivalent shear stress between the shield screw conveyor and the modified muck can be obtained, so that the equivalent shear stress between the shield screw conveyor and the modified muck can be accurately measured.

According to a further embodiment of the present disclosure, there is provided a device for measuring equivalent shear stress between a shield screw conveyor and modified muck, where the measurement components further include a speed reduction motor configured to drive the spiral device to rotate, and the speed reduction motor is connected to the spiral device.

In this embodiment, the speed reduction motor can drive the spiral device to rotate, so that the spiral device stably conveys muck, which provides a precondition for measuring the equivalent shear stress between the shield screw conveyor and the modified muck, and ensures that the muck generates friction shear stress under the shield screw conveyor.

According to a further embodiment of the present disclosure, there is provided a device for measuring equivalent shear stress between a shield screw conveyor and modified muck, where the torque measurement component is a torque sensor.

In this embodiment, the torque sensor measures torque stably and has excellent performance. Common torque sensors fall into two types: dynamic torque sensors and static torque sensors, which are well known to a person skilled in the art and will not be described here.

Referring to FIG. 1 to FIG. 4, according to a further embodiment of the present disclosure there is provided a device for measuring equivalent shear stress between a shield screw conveyor and modified muck, including a spiral shell 120, a spiral shaft 140 and a spiral blade 130 configured to spirally move modified muck, a data calculation module configured to calculate equivalent shear stress, a torque sensor configured to measure the spiral driving torque between the spiral shaft 140 and the modified muck, an angle measurement component configured to measure a conveying angle of the modified muck, a first measurement component configured to measure a diameter of the spiral blade 130, a second measurement component configured to measure a depth of the spiral groove 110, a third measurement component configured to measure a length of the spiral shaft 140, a fourth measurement component configured to measure an installation inclination angle of the spiral shaft 140, a speed reduction motor configured to drive the spiral shaft 140 and the spiral blade 130 to rotate, and a density measurement component configured to measure an average density of the modified muck. The spiral blade 130 is wound around a periphery of the spiral shaft 140, a spiral groove 110 is formed between the spiral blade 130 and the spiral shell 120, and the spiral groove 110 is disposed on the spiral blade 130. The torque sensor, the angle measurement component, the first measurement component, the second measurement component, the third measurement component, the fourth measurement component and the density measurement component are respectively connected to the data calculation module. The speed reduction motor is connected to both the spiral shaft 140 and the spiral blade 130, and the spiral shaft 140, the spiral blade 130 and the spiral groove 110 are all installed in the spiral shell 120.

Figure 1:
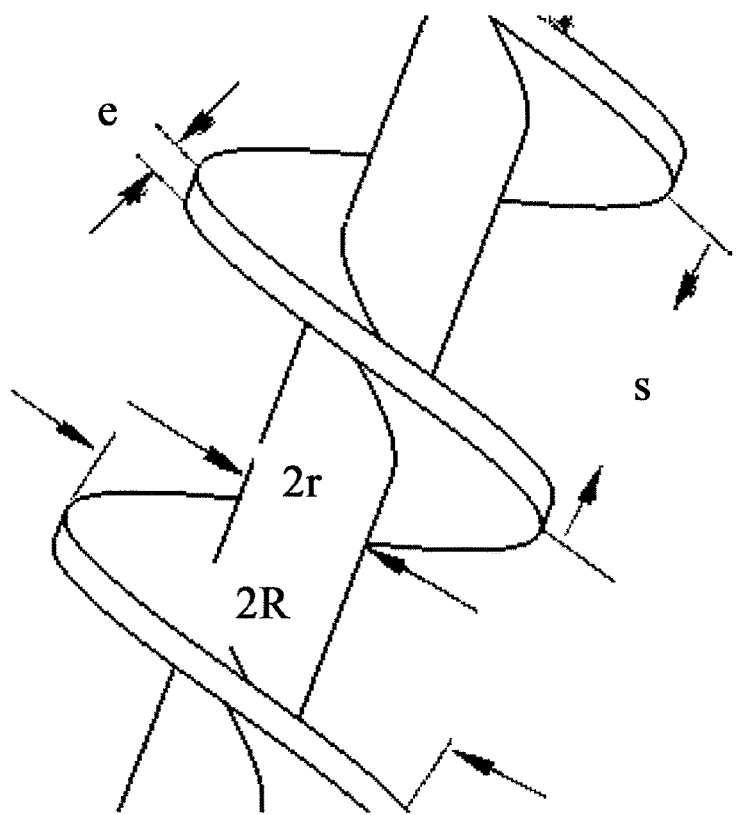
FIG. 1 is a schematic structural diagram of a spiral device according to an embodiment of the present disclosure.
Figure 2:
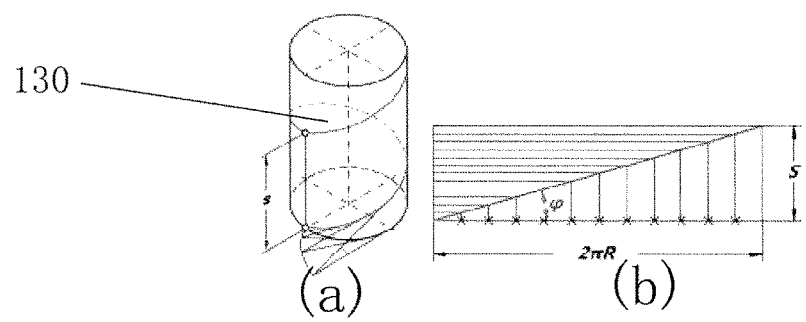
FIG. 2 is a schematic diagram of the definition of a spiral angle on a spiral blade according to an embodiment of the present disclosure.

In this embodiment, referring to FIG. 1, e is a thickness of the spiral blade 130, s is a screw pitch, $2r$ is a diameter of the spiral shaft 140, and 2R is a diameter of the spiral blade 130. Referring to FIG. 2, an included angle formed between a tangent of any point on the spiral blade 130 and its projection in the horizontal direction is a spiral angle. After a spiral line of one screw pitch is unfolded, the spiral line is a hypotenuse of a right triangle, the screw pitch is a right-angle side of the right triangle, and a projection of the spiral line in the horizontal direction is the other right-angle side, where FIG. 2(a) is a schematic stereoscopic diagram of the spiral blade 130, FIG. 2(b) is a schematic diagram of an unfolded structure of the spiral blade 130, and therefore the spiral angle of any point on the spiral blade 130 can be calculated.

$$\sin\varphi = \frac{dx}{dl} \quad (1)$$

where dx is an axial micro-increment and dl is a micro-increment in the spiral direction of the spiral blade 130.

In addition, the spiral angle of the outer edge of the spiral blade 130 can be calculated:

$$\varphi = \arctan\frac{s}{2\cdot\pi\cdot R} \quad (2)$$

Figure 4:
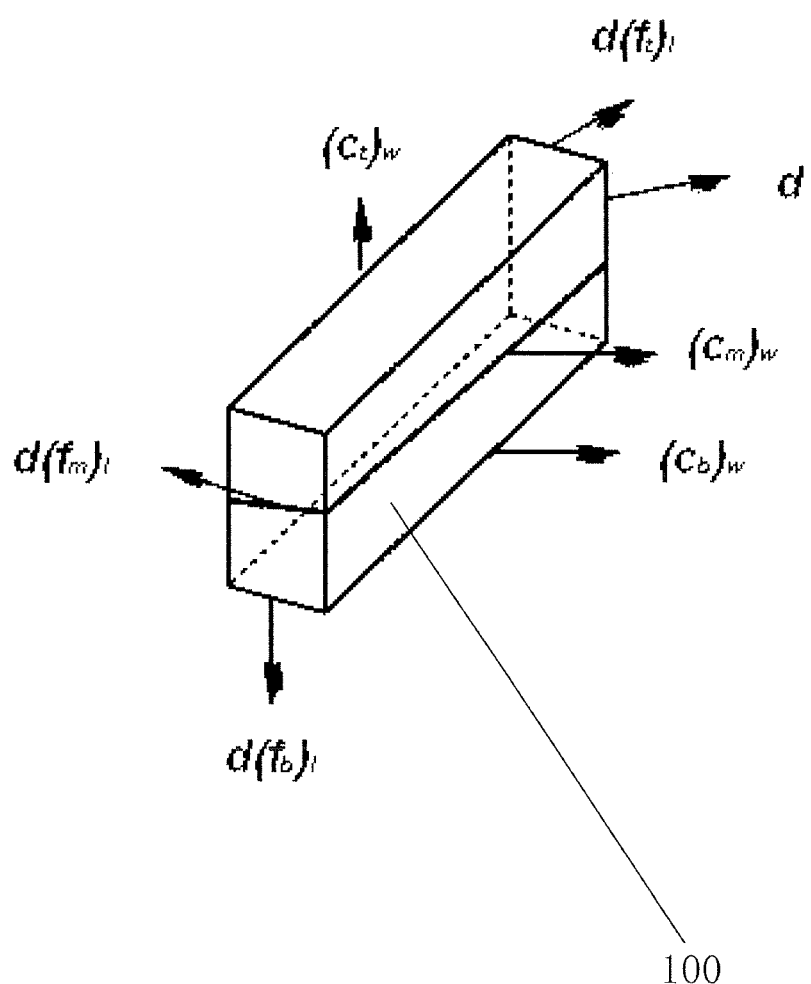
FIG. 4 is an enlarged schematic diagram of the muck micro unit in FIG. 3.

A muck micro unit 100 in the spiral groove 110 is used as a research object. As shown in FIG. 3, assuming that the modified muck is homogeneous flow plastic and isotropic, lengths of the muck micro unit 100 in various directions are shown in FIG. 4, where in the direction of the spiral groove 110, the muck micro unit 100 has a top length of $d(f_t)_l$, an average length of $d(f_m)_l$ and a bottom length of $d(f_b)_l$; the muck micro unit 100 has a top width of $(c_t)_w$, an average width of $(c_m)_w$ and a bottom width of $(c_b)_w$; and the spiral groove 110 has a depth of d.

Then the following can be obtained according to geometric relationships:

$$\sin\varphi = \frac{dx}{d(f_t)_l} \quad (3)$$

$$\sin\varphi_m = \frac{dx}{d(f_m)_l} \quad (4)$$

$$(c_t)_w = (s-e)\cdot\cos\varphi \quad (5)$$

$$(c_m)_w = (s-e)\cdot\cos\varphi_m \quad (6)$$

When the modified muck moves upward spirally in the spiral groove 110, a spiral torque is generated under the action of the force in the rotation direction of the spiral shaft 140. The following theoretical model of equivalent spiral shear stress is derived from the spiral torque balance in the direction perpendicular to the spiral shaft 140:

When the shield screw conveyor tunnels smoothly, the screw conveyor quantitatively discharges the modified muck. From the movement and stress diagram of the research object, it can be seen that only the friction shear stress $\tau_c$ between the muck and the spiral shell and the gravity G of the muck micro-unit have a component force opposite to the rotation direction of the spiral shaft 140. According to the balance condition of the torque perpendicular to the direction of the spiral shaft 140, formula (7) is obtained as follows:

$$dT = -\tau_c\cdot(c_t)_w\cdot d(f_t)_l\cdot\cos\theta\cdot R - \rho\cdot g\cdot d\cdot(c_m)_w\cdot d(f_m)_l\cdot\cos\phi\cdot\left(R-\frac{d}{2}\right) \quad (7)$$

where the minus on one side of the equal sign in equation (7) indicates that the gravity G of the muck micro-unit and component moment of spiral shell shear stress $\tau_c$ in the direction perpendicular to the spiral shaft 140 are opposite to the direction of the rotational torque. $\theta$ is the muck conveying angle, R is the radius of the spiral blade 130, $\rho$ is the average density of the muck, g is the gravitational acceleration, $\varphi$ is the installation inclination angle of the spiral shaft 140, and d is the depth of the spiral groove 110.

Formulas (1) and (3)-(6) are substituted into formula (7). To simplify the analysis, the thickness e of the spiral blade 130 is ignored, and the following formula (8) can be obtained:

$$dT = -\tau_c\cdot\frac{s}{\tan\varphi}\cdot R\cdot\cos\theta\cdot dx - \rho\cdot g\cdot d\cdot\frac{s}{\tan\varphi_m}\cdot\cos\phi\cdot dx \quad (8)$$

Further, the difference in the average spiral angle between the spiral blades 130 is ignored, and formula (8) can be further simplified from equation (2) to the following equation:

$$dT = -2\pi \cdot \tau_c \cdot R^2 \cdot \cos\theta \cdot dx - 2\pi \cdot \rho \cdot g \cdot d \cdot \left(R - \frac{d}{2}\right)^2 \cdot \cos\phi \cdot dx \quad (9)$$

Formula (9) is integrated in the spiral direction. Assuming that the spiral length is L and the muck filling rate is 100%, formula (10) can be obtained as follows:

$$\tau_c = -\frac{T}{2\pi \cdot R^2 \cdot \cos\theta \cdot L} - \frac{\rho \cdot g \cdot d \cdot \left(R - \frac{d}{2}\right)^2 \cos\phi}{R^2 \cdot \cos\theta} \quad (10)$$

It can be seen from formula (10) that the shear stress is affected by spiral geometric parameters, muck density, spiral installation angle, operating state parameters, and the like. With this formula, the shear stress of modified muck can be calculated under different torques and muck flow directions. When θ is 0°, the shield screw conveyor is blocked, and the muck does not move in the direction of the spiral shaft 140. The shear stress when the muck is blocked can be calculated from formula (10), which provides quantitative technical guidance for protecting the shield screw conveyor from blockage. It can be seen from formula (10) that with a given geometric structure and a given installation inclination angle of the spiral device, the shear stress of the modified muck is directly proportional to the spiral driving torque and inversely proportional to the muck conveying angle. That is, the harder the muck is, the larger the required spiral driving torque is under the same muck conveying angle.

The foregoing has described in detail the preferred embodiments and basic principles of the present disclosure, but the present disclosure is not limited to the foregoing embodiments. A person skilled in the art should understand that various equivalent modifications and replacements may be made without departing from the concept of the present disclosure, and these equivalent modifications and replacements shall fall within the claimed scope of the present disclosure.

What is claimed is:

1. A device for measuring equivalent shear stress between a shield screw conveyor and modified muck, comprising:
    a spiral shell (120),
    a spiral device configured to load and spirally move the modified muck,
    a data calculation module configured to calculate equivalent shear stress, and
    measurement components configured to measure parameters required for the data calculation module to calculate the equivalent shear stress, comprising:
        a torque measurement component configured to measure spiral driving torque between the spiral device and the modified muck,
        an angle measurement component configured to measure a conveying angle of the modified muck,
        a parameter measurement component configured to measure structural parameters of the spiral device, and
        a density measurement component configured to measure an average density of the modified muck,
    wherein the torque measurement component, the angle measurement component, the parameter measurement component and the density measurement component are respectively connected to the data calculation module, and the spiral device is installed in the spiral shell (120).

2. The device for measuring equivalent shear stress between a shield screw conveyor and modified muck of claim 1, wherein the spiral device comprises:
    a spiral shaft (140),
    a spiral blade (130) wound around a periphery of the spiral shaft (140), and
    a spiral groove (110) formed between the spiral blade (130) and the spiral shell (120).

3. The device for measuring equivalent shear stress between a shield screw conveyor and modified muck of claim 2, wherein the parameter measurement component comprises:
    a first measurement component configured to measure a diameter of the spiral blade (130),
    second measurement component configured to measure a depth of the spiral groove (110),
    a third measurement component configured to measure a length of the spiral shaft (140), and
    a fourth measurement component configured to measure an installation inclination angle of the spiral device
    wherein the first measurement component, the second measurement component, the third measurement component and the fourth measurement component are respectively connected to the data calculation module.

4. The device for measuring equivalent shear stress between a shield screw conveyor and modified muck of claim 1, wherein the measurement components further comprises a speed reduction motor configured to drive the spiral device to rotate, and the speed reduction motor is connected to the spiral device.

5. The device for measuring equivalent shear stress between a shield screw conveyor and modified muck of claim 4, wherein the torque measurement component is a torque sensor.

* * * * *